United States Patent
Boger et al.

(10) Patent No.: US 6,234,688 B1
(45) Date of Patent: May 22, 2001

(54) PACKAGED INTEGRATED, ACTIVELY ALIGNED WITH SUB-MICRON ACCURACY SINGLE MODE FIBER OPTIC CONNECTOR BULKHEAD RECEPTACLE

(75) Inventors: David H. Boger, Redondo Beach; Xenophon G. Glavas, Palos Verdes Estates, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/314,773

(22) Filed: May 19, 1999

(51) Int. Cl.[7] .............................. G02B 6/00; G02B 6/255
(52) U.S. Cl. ............................................................ 385/92
(58) Field of Search ................................ 385/49, 88–94, 385/130, 15, 147; 359/858; 250/551; 257/551

(56) References Cited

U.S. PATENT DOCUMENTS

| | | |
|---|---|---|
| 3,790,791 | 2/1974 | Anderson . |
| 4,204,306 | 5/1980 | Makuch . |
| 4,696,538 | 9/1987 | Despouys . |
| 4,711,517 | 12/1987 | Fentress et al. . |
| 4,804,243 | 2/1989 | Borsuk et al. . |
| 4,974,924 | 12/1990 | Okada et al. . |
| 5,052,768 | 10/1991 | Matumoto et al. . |
| 5,052,774 | 10/1991 | Bulman et al. . |
| 5,096,276 | 3/1992 | Gerace et al. . |
| 5,146,525 | 9/1992 | Tabone . |
| 5,216,733 | 6/1993 | Nagase et al. . |
| 5,231,686 | 7/1993 | Rabinovich . |
| 5,276,752 | 1/1994 | Gugelmeyer et al. . |
| 5,315,680 | 5/1994 | Musk et al. . |
| 5,369,529 * | 11/1994 | Kuo et al. ............................ 250/551 |
| 5,390,269 | 2/1995 | Palecek et al. . |
| 5,621,835 | 4/1997 | Takahashi et al. . |
| 5,621,836 | 4/1997 | Schofield et al. . |
| 5,644,673 | 7/1997 | Patterson . |
| 5,647,044 * | 7/1997 | Basavanhally et al. ............ 385/94 |
| 5,717,802 | 2/1998 | Briggs et al. . |
| 5,796,898 | 8/1998 | Lee . |
| 6,103,398 * | 8/2000 | Norton et al. ...................... 385/49 |

OTHER PUBLICATIONS

Soon Jang, "Packaging of photonic devices using laser welding," Oct. 1995, pp. 138–149, SPIE, vol. 2610.
Advertisement of an optoelectric package utilizing a detachable connector, Laser & Optics Magazine, Feb. 15, 1998, p. 15, Coherent Semiconductor Group.

* cited by examiner

*Primary Examiner*—Akm E. Ullah
(74) *Attorney, Agent, or Firm*—Michael S. Yatsko

(57) ABSTRACT

A method of aligning a photonic device (12) to an optical fiber (20) with sub-micron accuracy. The photonic device packaging assembly (10) includes a housing (16) defining a cavity (14) therein, where the photonic device (12) is mounted within the cavity (14). A single mode fiber (20) having a lensed end (18) is inserted into the cavity (14) to be aligned with the photonic device (12). A fiber (20) extends into a cylindrical ferrule (24) and is soldered therein such that a polished end (26) of the fiber (12) opposite the lensed end (18) is flush with an end to the ferrule (24). The ferrule (24) extends through an opening (28) in the housing (16). A flange (36) is positioned around the ferrule (24) and is welded to an outside wall (42) of the housing (16). An alignment process is used to align the optical fiber (20) to the photonic device (12) with sub-micron accuracy. The fiber (20) is aligned in a Z-direction and then the ferrule (24) is optically welded to the flange (36). Then, the fiber (20) is aligned to the photonic device (12) and the X- and Y-direction, and the flange (36) is optically welded to the housing (16). A connector adaptor (48) is positioned around the flange (36) and the ferrule (24), and is mounted to the housing wall (30) so that the ferrule (24) extends partially into a bore extending through the connector adaptor (48). A connector can be attached to the connector adaptor (48) to attach the photonic device (12) to an optical system.

24 Claims, 2 Drawing Sheets

PACKAGED INTEGRATED, ACTIVELY ALIGNED WITH SUB-MICRON ACCURACY SINGLE MODE FIBER OPTIC CONNECTOR BULKHEAD RECEPTACLE

BACKGROUND OF THE INVENTION

1. Field of the Invention

This invention relates generally to a packaging assembly for a photonic device that employs a bulkhead connector and, more particularly, to a method of aligning an optical fiber to a photonic device with sub-micron accuracy in a packaging assembly that employs a bulkhead connector.

2. Discussion of the Related Art

Certain photonic devices having small active areas, such as photodetectors, laser diodes and optical modulators, are sometimes mounted within a cavity of a housing as part of a device packaging assembly. For high frequency applications (>1 GHz), a detachable connector is needed for single mode or polarization maintaining fiber at 1310/1550 nm wavelengths to a hermetic package. An optical fiber is coupled to the photonic device to transmit optical signals applied to or generated by the device through the housing. The end of the optical fiber proximate the photonic device typically includes a lens for efficient optical coupling between the photonic device and the fiber to reduce optical losses. The fiber extends through the housing and is attached to a specialized connector adaptor, such as an FIS connector adaptor. The end of the fiber positioned within the connector is typically a bare fiber that is polished. The connector adaptor can be attached to a connector in a threaded or snap-fit engagement that aligns the polished end of the fiber with another fiber to connect the photonic device to an optical system.

The known packaging assemblies for a photonic device generally include a length of fiber extending from the housing that is attached to the connector adaptor. This length of fiber is generally referred to in the art as a fiber pigtail. Typically, this fiber pigtail is >1 foot in length. The fiber pigtail is a weak link in the packaging of the photonic device because it has a tendency to be easily damaged or broken. When the fiber pigtail breaks or becomes defective, the entire packaging assembly, including the photonic device, becomes useless and must be replaced. Therefore, the fiber pigtail is a source of increased cost and unreliability for the optical system.

The tensed end of the fiber must be optically aligned with the photonic device. Sometimes the photonic device must support single mode or polarization maintaining, single mode fibers. In these types of applications, it is generally necessary to align the fiber to the photonic device within the housing with sub-micron accuracy. Automated alignment and laser welding systems are known in the art, such as the Newport Corporation laser weld workstation (LWWS), that provide this level of alignment accuracy for the fiber pigtail type design. In a typical alignment process, the fiber is soldered to the ferrule, and then the LWWS aligns the lensed end of the fiber to the photonic device. The photonic device is previously soldered to the housing. The article, Jang, Soon, "Packaging of Photonic Devices Using Laser Welding," Society of Photo-Optical Instrumentation Engineers, Vol. 2610, May 1996, pgs. 138–149 discusses the LWWS.

What is needed is an improved method of aligning a fiber to a photonic device with sub-micron accuracy within a packaging assembly of the type described above that eliminates the fiber pigtail. It is therefore an object of the present invention to provide such a method.

SUMMARY OF THE INVENTION

In accordance with the teachings of the present invention, a packaging assembly for a photonic device and a method of aligning the optical fiber to a device with sub-micron accuracy is disclosed. The photonic device packaging assembly includes a housing defining a cavity therein, where the photonic device is mounted within the cavity. A single mode fiber having a lensed end is inserted into the cavity to be aligned with the photonic device. The fiber extends into a cylindrical ferrule and is soldered therein such that a polished end of the fiber opposite the lensed end is flush with an end of the ferrule. The ferrule extends through an opening in the housing. A flange is positioned around the ferrule and is welded to an outside wall of the housing. A connector adaptor is positioned around the flange and the ferrule, and is mounted to the housing wall so that the ferrule extends partially into a bore extending through the connector adaptor. A connector can be attached to the connector adaptor to attach the photonic device to an optical system.

An alignment process is employed to align the photonic device to the optical fiber with sub-micron accuracy. The fiber is aligned to the photonic device in the Z-direction and the fibered ferrule is laser optically welded to the flange. Then, the fiber is aligned to the photonic device in the X- and Y-direction, and the flange is laser optically welded to the housing.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a packaging assembly for a photonic device and method of aligning the photonic device to an optical fiber with sub-micron accuracy is merely exemplary in nature and is in no way intended to limit the invention or its applications or uses.

Figure 1:
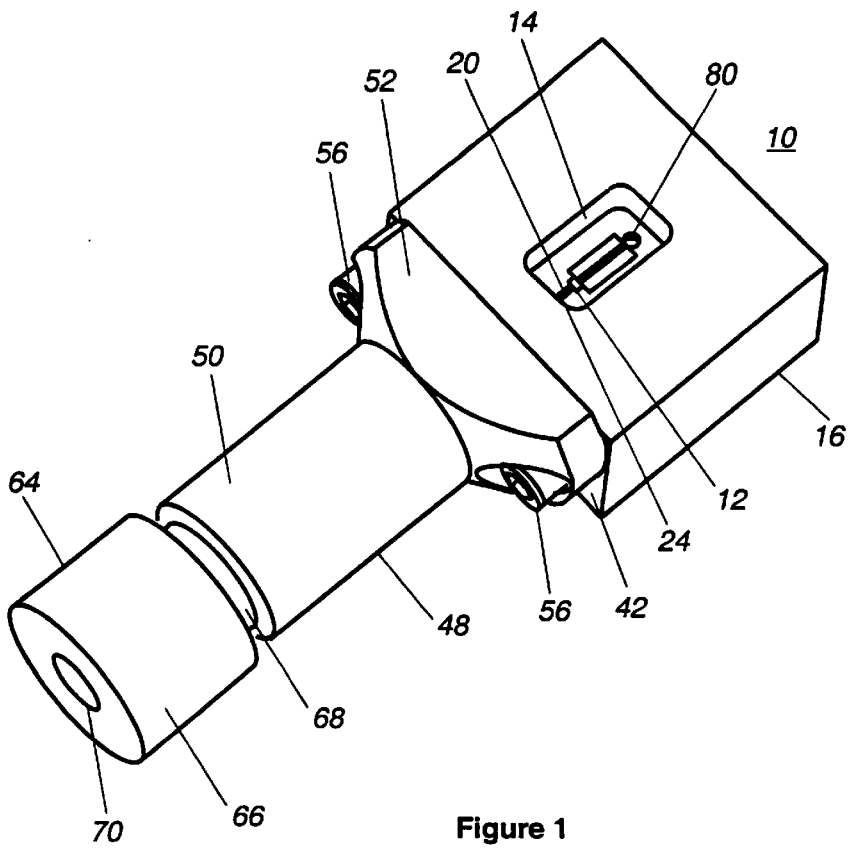
FIG. 1 is an isometric view of a packaging assembly for a photonic device that allows device alignment with sub-micron accuracy, according to an embodiment of the present invention.
Figure 2:
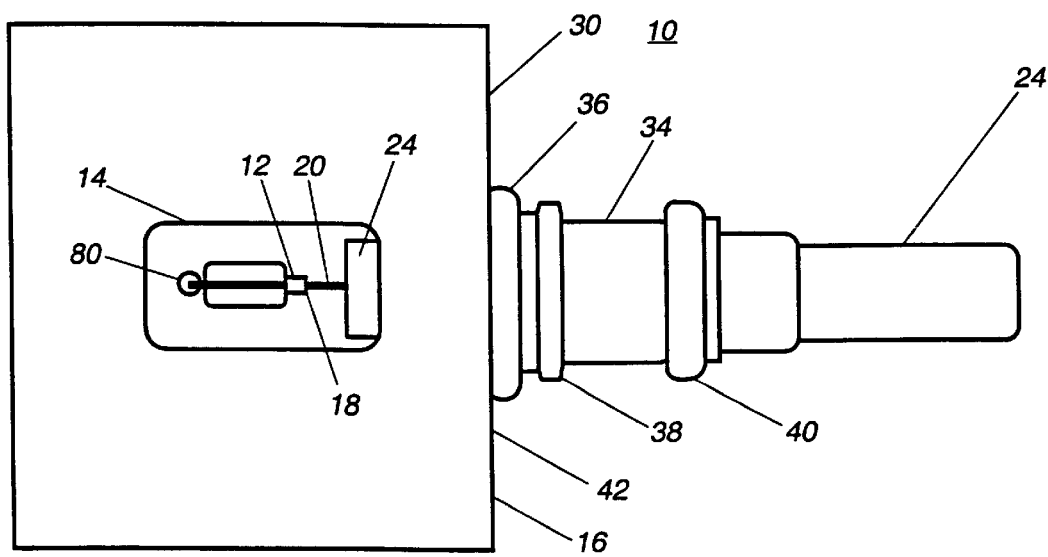
FIG. 2 is a top view of the packaging assembly shown in FIG. 1 with the connector adaptor removed.
Figure 3:
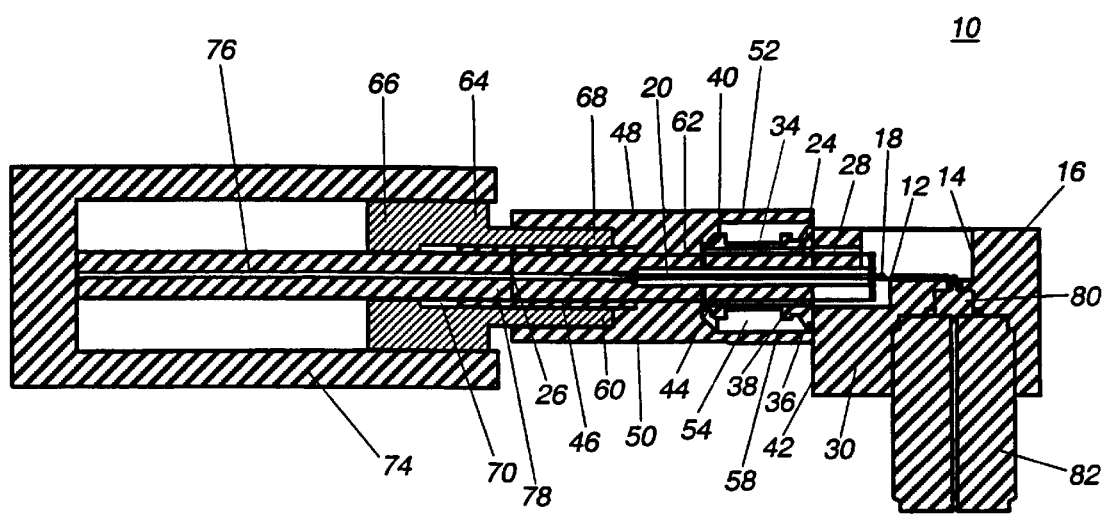
FIG. 3 is a cross-sectional view of the packaging assembly shown in FIG. 1 attached to a connector.

FIG. 1 is a perspective view, FIG. 2 is a top view and FIG. 3 is a cross-sectional view of a packaging assembly 10 for a photonic device 12. The photonic device 12 can be any optical device that is to be coupled to a single mode fiber with sub-micron accuracy, such as a waveguide, photodetector, laser diode, optical modulator, etc. The device 12 is mounted within a cavity 14 defined in a device housing 16. The cavity 14 would be covered by a suitable housing cover (not shown) to seal the housing 16. As will be described below, a lensed end 18 of a metallized, single mode or polarization maintaining optical fiber 20 is optically coupled to the device 12 within the cavity 14 with sub-micron accuracy to allow a high efficiency optical propagation between the device 12 and the fiber 20. The fiber 20 is aligned to the device 12 by any suitable fiber alignment system, such as the LWWS referred to above, as will be described below.

According to the invention, the fiber 20 extends into a cylindrical ferrule 24. The fiber is soldered within the ferrule 24 so that a polished end 26 of the fiber 20 opposite the lensed end 18 of the fiber 20 is substantially flush with an end of the ferrule 24 outside of the housing 16. The other end of the ferrule 24 is positioned in the cavity 14. The ferrule 24 extends through an opening 28 in an end wall 30 of the housing 16 that is sized to accept the ferrule 24 in a slidable, friction-type fit. The housing 16 and the ferrule 24 can be made of any suitable material that can be laser welded, such as Kovar.

A specially configured flange 34, including a mounting ring 36, an intermediate ring 38 and an end ring 40, is welded to an outer surface 42 of the wall 30. The flange 34 is also made of any suitable material that can readily be optically welded. The fibered ferrule 24 is positioned in a bore 44 provided through the flange 34, so that it extends beyond the end of the flange 34 opposite the wall 30, as shown. An alignment sleeve 46 is positioned around the end of the ferrule 24 extending from the flange 34. A female connector adaptor 48, including a cylindrical portion 50, a mounting base 52 and an internal bore 54, is positioned over the flange 34 and is mounted to the surface 42 by bolts 56. FIG. 2 shows the packaging assembly 10 with the female connector adaptor 48 removed to show the flange 34. The bore 50 includes a first widened portion 58 that is sized to accept the flange 34 proximate the surface 42, a second widened portion 60 opposite the surface 42, and a narrowed portion 62 therebetween that accepts the ferrule 24 in a slidable fit. When the bolts 56 are removed form the housing 16, the adaptor 48 can be easily slid off of the ferrule 24. A T-shaped male connector adaptor 64 is provided that includes a threaded end piece 66, a narrowed portion 68 which pressfits into 48 and an internal bore 70. The narrowed portion 68 of the connector adaptor 64 slides over the alignment sleeve 46 and is positioned in the widened portion 60 so that the ferrule 24 extends into the bore 70 in a slidable friction fit, as shown.

A connector 74 is provided to optically couple a fiber 76 within a ferrule 78 to the fiber 20, within the sleeve 46. The connector 74 is threadably attached to the end piece 66 so that the fibered ferrule 76 slides within the bore 70 and the alignment sleeve 46, and abuts against the end of the ferrule 24 extending from the housing 16. An RF feed-through 80 extends into the cavity 14 and is electrically connected to an RF connector 82 mounted to the housing 16, as shown. Therefore, the photonic device 12 can be optically and electrically connected to an optical system in the manner as described.

The LWWS, or another suitable alignment system, is used to align the fiber 20 to the photonic device 12 with sub-micron accuracy, according to the invention. Before the ferrule 24 is welded to the flange 34 and the flange 34 is welded to the housing 16, the LWWS aligns the fiber 20 to the device 12 in the Z-direction when the flange 34 is positioned flush against the surface 42. The Z-direction is defined as the direction defined by the length of the fiber 20. When the fiber 20 is aligned in the Z-direction, the ferrule 24 is welded to the flange 34. In one embodiment, the ferrule 24 is welded to the flange 34 between the end ring 40 and the intermediate ring 38. The LWWS is then used to align the fiber 20 to the device 12 in the X- and Y-direction. When the fiber 20 is aligned to the device 12 in the X- and Y-direction, the flange 34 is welded to the surface 42 at selected spots around the mounting ring 36 so that the fiber 20 is aligned in all three axis. The photonic device 12 is then hermetically sealed by additional welds between the end ring 40 and the ferrule 24, and the mounting ring 36 and the surface 42. Once the device 12 is sealed, additional welds to the mounting ring 36 can be provided to fine tune the alignment to a sub-micron accuracy.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of aligning a photonic device to an optical fiber, said method comprising the steps of:

mounting the photonic device within a cavity defined in a housing;

soldering the fiber into a first ferrule;

positioning the ferrule within an opening through the housing so that the ferrule extends outside of the housing;

positioning a flange around the ferrule outside of the housing;

optically aligning the fiber to the photonic device within the cavity; and welding the aligned ferrule to the flange and welding the flange to the housing.

2. The method according to claim 1 wherein the steps of aligning and welding include aligning the fiber to the photonic device in the Z-direction and welding the first ferrule to the flange, and then aligning the fiber to the photonic device in the X- and Y-direction and welding the flange to the housing.

3. The method according to claim 2 wherein the step of welding the first ferrule to the flange includes welding through the flange between two outer rings of the flange.

4. The method according to claim 2 wherein the step of welding the flange to the housing includes welding the flange at selected positions around a mounting ring of the flange that is positioned against the housing.

5. The method according to claim 1 wherein the step of welding the aligned ferrule and welding the flange includes the step of hermetically sealing the housing.

6. The method according to claim 5 wherein the step of hermetically sealing the housing during the welding steps includes welding the ferrule to the flange around an end of the flange where the ferrule extends from the flange, and completely welding around an end of the flange positioned against the housing.

7. The method according to claim 1 further comprising the steps of positioning a first connector adaptor around the flange and an end of the ferrule extending from the housing and mounting the first connector adaptor to the housing.

8. The method according to claim 7 further comprising the step of positioning a second connector adaptor within the first connector adaptor and over the end of the ferrule extending from the housing adjacent an end of the flange.

9. The method according to claim 8 wherein the steps of positioning a first connector adaptor and a second connector adaptor include positioning the flange in a widened bore at one end of the first connector adaptor and positioning the second connector adaptor within a second widened portion at an opposite end of the first connector adaptor.

10. The method according to claim 8 further comprising the steps of attaching a connector to the second connector adaptor and positioning a second ferrule in an abutting optical engagement with the first ferrule.

11. The method according to claim 1 wherein the steps of optically aligning and welding includes using an LWWS machine.

12. A method of coupling a photonic device to an optical fiber, said method comprising the steps of:

mounting the photonic device within a housing;

positioning the fiber within a ferrule so that a first end of the fiber extends from the ferrule and a second end of the fiber is positioned within the ferrule;

positioning the fibered ferrule in an opening extending through a wall of the housing so that the end of the ferrule proximate the second end of the fiber extends outside of the housing;

positioning a flange around the end of the ferrule extending outside of the housing;

aligning the first end of the fiber to the photonic device;

welding the ferrule to the flange and the flange to the housing in a hermetic seal;

positioning a first connector adaptor around the flange and the ferrule; and mounting the connector adaptor to the housing.

13. The method according to claim 12 wherein the steps of aligning and welding include aligning the fiber to the photonic device in the Z-direction and welding the first ferrule to the flange, and then aligning the fiber to the photonic device in the X-and Y-direction and welding the flange to the housing.

14. The method according to claim 12 wherein the step of hermetically sealing the housing during the welding step includes welding the ferrule to the flange around an end of the flange from which the ferrule extends and welding around an end of the flange positioned against the housing.

15. The method according to claim 12 further comprising the step of positioning a second connector adaptor within the first connector adaptor over the end of the ferrule extending from the housing adjacent an end of the flange.

16. The method according to claim 12 wherein the step of welding includes employing a laser welding process.

17. A packaging assembly for a photonic device comprising:

a housing including a cavity, said device being mounted within the cavity, said housing further including an opening and a housing wall, said opening extending from the cavity through the wall;

an optical device fiber including a first end and a second end, said first end of the fiber being optically coupled to the photonic device within the cavity;

a ferrule, said ferrule extending through the opening from the cavity outside the housing, said fiber extending into the ferrule; and a flange, said flange being positioned around an end of the ferrule extending from the housing and being welded to the housing.

18. The assembly according to claim 17 wherein the flange includes a mounting ring positioned against the housing, an end ring at an end of the flange opposite the housing, and an intermediate ring between the mounting ring and the end ring.

19. The assembly according to claim 18 wherein the ferrule is welded to the flange between the intermediate ring and the end ring.

20. The assembly according to claim 17 wherein the ferrule is welded to the flange proximate at an end of the flange opposite the housing to provide a hermetic seal.

21. The assembly according to claim 17 wherein the flange is welded to the housing around a circumference of the flange to provide a hermetic seal.

22. The assembly according to claim 17 further comprising a first connector adaptor, said first connector adaptor being positioned around the flange and the ferrule, and being mounted to the housing.

23. The assembly according to claim 22 further comprising a second connector adaptor including a bore extending therethrough, said second connector adaptor including an extended portion positioned within a bore through the first connector adaptor so that the ferrule extends within the bore in the second connector adaptor.

24. The assembly according to claim 23 wherein the second connector adaptor includes a widened end having external threads.

* * * * *